United States Patent [19]
Jeffer et al.

[11] Patent Number: 5,742,974
[45] Date of Patent: *Apr. 28, 1998

[54] ARTICULATED WINDSHIELD WIPER BLADE ASSEMBLY

[75] Inventors: Peter H. Jeffer, New York, N.Y.; Michel Fernandes, E. Freetown, Mass.

[73] Assignee: New-View Windshield Wiper, L.P., Freeport, N.Y.

[*] Notice: The term of this patent shall not extend beyond the expiration date of Pat. No. 5,644,814.

[21] Appl. No.: 781,277

[22] Filed: Jan. 10, 1997

Related U.S. Application Data

[63] Continuation-in-part of Ser. No. 708,669, Sep. 5, 1996, Pat. No. 5,644,814, which is a continuation-in-part of Ser. No. 634,346, Apr. 18, 1996, Pat. No. 5,572,764.

[51] Int. Cl.$^6$ ............................. B60S 1/38; B60S 1/04
[52] U.S. Cl. ...................... 15/250.361; 15/250.44; 15/250.33; 15/250.451; 15/250.48
[58] Field of Search ................ 15/250.361, 250.48, 15/250.4, 250.41, 250.33, 245, 250.451, 250.452, 250.453, 250.44

[56] References Cited

U.S. PATENT DOCUMENTS

| | | | |
|---|---|---|---|
| 2,179,451 | 11/1939 | Horton | 15/250.4 |
| 3,099,031 | 7/1963 | Ludwig | 15/250.451 |
| 3,766,591 | 10/1973 | Soito | 15/245 |
| 4,698,874 | 10/1987 | Fritz, Jr. | 15/250.48 |
| 5,392,488 | 2/1995 | Li | 15/250.451 |

FOREIGN PATENT DOCUMENTS

| | | | |
|---|---|---|---|
| 1033520 | 4/1953 | France | 15/250.33 |
| 1047648 | 7/1953 | France | 15/250.33 |
| 59350 | 10/1954 | France | 15/250.4 |
| 138048 | 10/1981 | Japan | 15/250.451 |
| 636231 | 4/1950 | United Kingdom | 15/250.48 |
| 2189383 | 10/1987 | United Kingdom | 15/250.33 |

*Primary Examiner*—Gary K. Graham
*Attorney, Agent, or Firm*—Salter & Michaelson

[57] ABSTRACT

An articulated twin spline windshield wiper blade assembly includes an elongated, resilient, thin-walled polymeric female spline of relatively high durometer having a generally planar backbone, and two opposing arcuate spline legs which extend downwardly from the backbone and cooperate with the backbone to define a cylindrical spline channel. The wiper blade assembly further includes an elastomeric male spline having a cylindrical body portion rotatably journaled within the spline channel of the female spline. The male spline further includes a neck portion depending from the body portion, and a wiping portion depending from the neck portion. The wiping portion includes opposing wiping edges which are alternately engagable with a surface to be wiped upon rotation of the male spline within the spline channel. The spline legs are specifically designed so that they are sufficiently resilient to permit flexure of the spline legs relative to the backbone during rotation of the male spline so as not to bind the male spline during rotation thereof, particularly when the spline contours to a curved windshield. To further reduce friction and resistance to rotation, the cylindrical body portion of the male spline is truncated at its uppermost edge. An ancillary benefit of the truncation is the discharge of water and debris outwardly of the spline channel at the end of the spline channel.

1 Claim, 2 Drawing Sheets

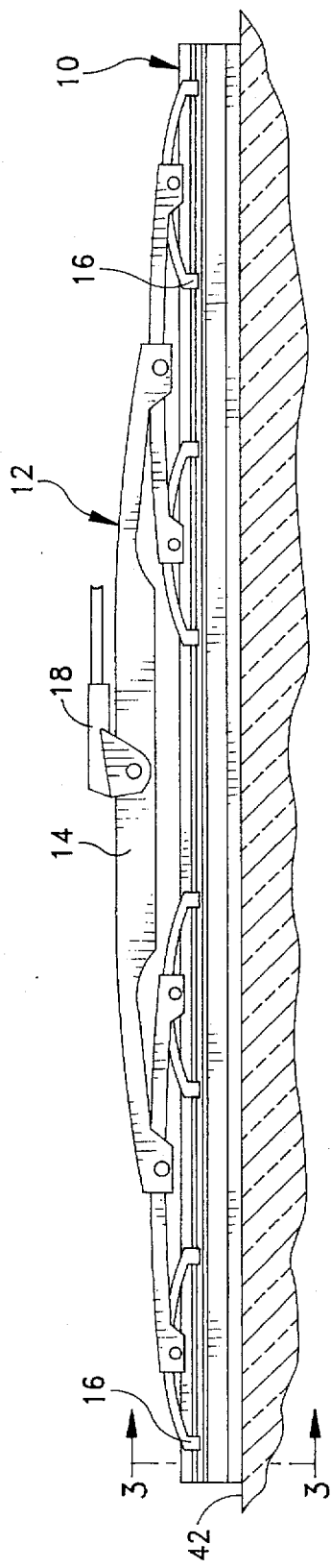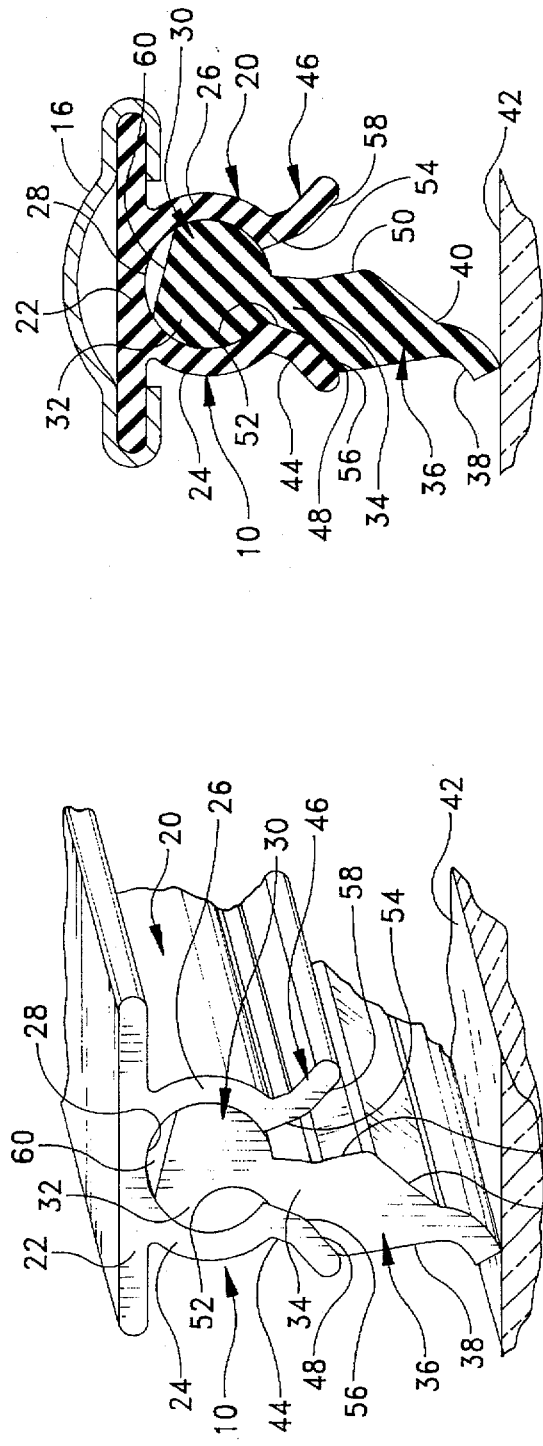

ARTICULATED WINDSHIELD WIPER BLADE ASSEMBLY

RELATED APPLICATIONS

This application is a continuation-in-part of application Ser. No. 08/708,669, filed Sep. 5, 1996, now U.S. Pat. No. 5,644,814, which is a continuation-in-part of application Ser. No. 08/634,346 filed Apr. 18, 1996 which is now U.S. Pat. No. 5,572,764.

BACKGROUND AND SUMMARY OF THE INVENTION

Windshield wiper blade assemblies that utilize rotation of a wiping blade relative to a carrier are known in the art. While such known blade assemblies exhibit improved wiping performance, they fail to solve a problem associated with positive articulation or "flip" of the wiper blade as well as the speed of the "flip". Specifically, the wiper blades of the known articulated blade assemblies exhibit relatively high resistance to rotation thereby inhibiting the "flip" of the wiper blade.

The instant invention provides an articulated twin-spline windshield wiper blade assembly which is specially designed to reduce friction during rotation and thereby optimize the "flip" of the wiper blade. The wiper blade assembly includes an elongated, resilient, thin-walled polymeric female spline of relatively high durometer polymeric material having a generally planar backbone, and two opposing arcuate spline legs which extend downwardly from the backbone and cooperate with the backbone to define a cylindrical spline channel. The wiper blade assembly further includes an elastomeric male spline of relatively low durometer elastomeric material having a cylindrical body portion rotatably journaled within the cylindrical spline channel of the female spline. The male spline further includes a neck portion depending from the body portion, and a wiping portion depending from the neck portion. The wiping portion includes opposing wiping edges which are alternately engagable with a surface to be wiped upon rotation of the male spline within the cylindrical spline channel.

The key feature in connection with the instant invention is that the spline legs are specifically designed so that they are sufficiently resilient to permit flexure of the spline legs relative to the backbone so as not to bind the male spline during rotation thereof. The main problem in connection with the prior art was that the female spline body was too rigid to permit proper rotation of the male spline. The rigidity of the female spline caused friction during rotation for several reasons, including friction between the surfaces of the male spline and the channel, and the inability to permit any dirt or dust within the channel. The lack of flexibility in the female spline is believed to cause premature failure of the prior articulated wiper designs.

Another improvement of the wiper blade assembly comprises truncating the cylindrical body portion of the male spline at its uppermost edge to reduce friction between the splines previously caused by a protruding mold lip at the top of the cylindrical spline body, and to further eliminate the resistance to "flip" due to binding of the male spline within the cylindrical female spline, particularly when the spline contours to the surface of a curved windshield.

Accordingly, among the objects of the instant invention are: the provision of an articulated wiper blade assembly which optimizes "flip" of the wiper blade, i.e. male spline; the provision of a female spline for articulated wiper blade assembly wherein the female spline includes thin-walled, resilient spline legs which permit some flexure of the spline legs so as not to bind the male spline during rotation thereof; and the provision of a male spline wiper blade for an articulated wiper blade assembly wherein a cylindrical journaled body portion of the spline is truncated at its uppermost edge to further reduce friction between the body portion of the male spline and the interior channel surface of the female spline.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view of a windshield wiper assembly utilizing the articulated wiper blade assembly of the present invention;

FIG. 2 is an end view taken in the direction of arrow "2" in FIG. 1;

FIG. 3 is a cross-sectional view taken along line 3—3 of FIG. 1; and

DESCRIPTION OF THE PREFERRED EMBODIMENT

Figure 4:
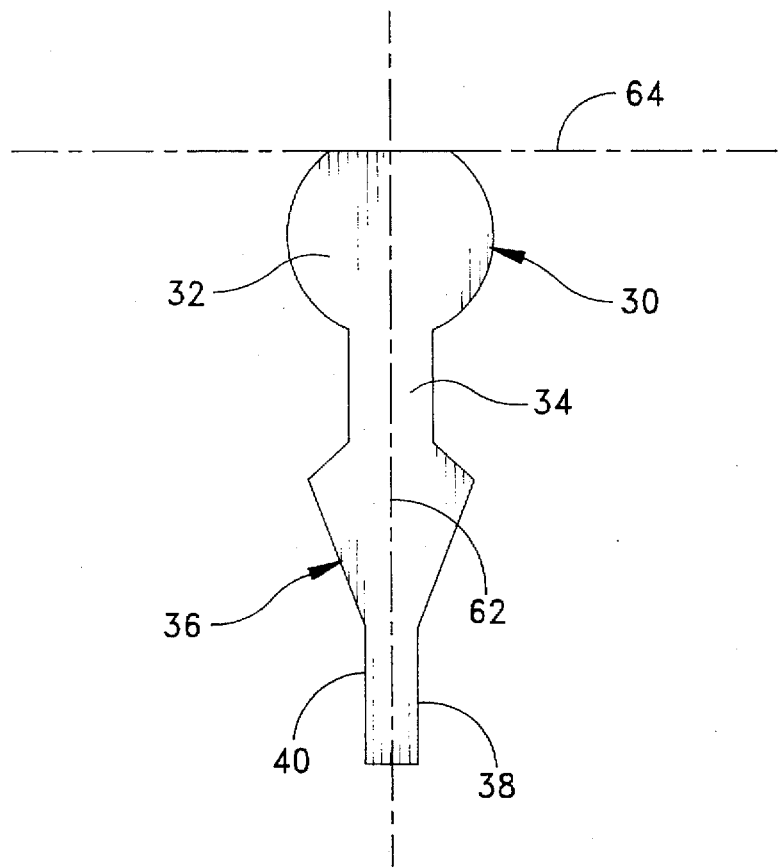
FIG. 4 is an end view of the male spline showing the planar orientation of the truncated edge.

Referring now to the drawings, the articulated wiper blade assembly of the instant invention is illustrated and generally indicated at 10 in FIGS. 1–3. As will hereinafter be more fully described, the instant wiper blade assembly 10 is intended to be received and supported within a windshield wiper assembly generally indicated at 12. More specifically, the windshield wiper assembly 12 comprises a conventional blade holder assembly 14 having a plurality of conventional claws 16. The blade holder assembly 14 is secured to the end of a wiper arm 18 in a conventional manner.

The wiper blade assembly 10 includes an elongated, resilient, thin-walled polymeric female spline generally indicated at 20. The female spline 20 is formed from a relatively high durometer polymeric material (110–130 durometer on the Rockwell R scale) and includes a generally planar backbone 22, and two opposing arcuate spline legs 24, 26 respectively, which extend downwardly from the backbone 22 and cooperate with the backbone 22 to define a cylindrical spline channel 28.

The wiper blade assembly 10 further includes an elastomeric male spline generally indicated at 30. The male spline 30 is formed from a relatively low durometer elastomeric material (55–65 durometer on the Shore "A" scale) and includes a cylindrical body portion 32 rotatably journaled within the spline channel 28 of the female spline 20. The male spline 30 further includes a neck portion 34 depending from the body portion 32, and a wiping portion generally indicated at 36 depending from the neck portion 34. The wiping portion 36 includes opposing wiping edges 38, 40 which are alternately engagable with a surface 42 to be wiped upon rotation of the male spline 30 within the spline channel 28.

The lower terminal ends of each of the spline legs 24, 26 includes a flared edge stop generally indicated at 44, 46 respectively, to limit rotation of the male spline 30. In this regard, the male spline 30 includes opposing shoulder portions 48, 50 adjacent the neck portion 34 thereof. The opposing surfaces of the neck portion 34 of the male spline 30 engage with first generally upright portions 52, 54 respectively, of the edge stops 44, 46 while the shoulder portions 48,50 of the male spline 30 engage with second angled portions 56, 58 of the edge stops 44, 46. The mating cooperating of the male spline surfaces 34, 48, 50, with the edge stops 44, 46 protects the channel 28 of the female spline 20 against ice and debris accumulation, and further takes advantage of the natural forces of the wind to apply a downward force against the surface 42 being wiped.

The key feature in connection with the instant invention is that the spline legs 24, 26 are specifically designed so that they are sufficiently resilient to permit flexure relative to the backbone 22 so as not to bind the male spline 30 during rotation thereof. The main problem in connection with the prior art was that the female spline body was too rigid to permit proper rotation of the male spline. The rigidity of the female spline caused friction during rotation for several reasons, including friction pressure between the surfaces of the male spline and the channel, and the inability to discharge dirt or dust from within the channel. The lack of flexibility in the prior art female splines led to functional failure, i.e. locking of the prior art articulated wiper designs. In this regard, it is noted that the present spline legs 24, 26 have a relatively thin wall thickness which permits greater flexure of the spline legs 24, 26 relative to the backbone 22. In effect, the female cylindrical spline 20 forms a flexible spring channel which is sufficiently rigid to hold the male spline 30 within the channel 28 yet permits flexure of the spline legs 24, 26 to allow rotation of the male spline 30, and permits further flexure along its length so that the wiper properly flexes over the contour of the windshield when mounted.

As an additional improvement to further reduce friction and resistance to rotation, the cylindrical body portion 32 of the male spline 30 is provided with a truncated uppermost edge 60 to reduce friction normally caused by a protruding mold lip formed during molding. In conventional molding of elastomeric materials, a protruding mold lip would normally be created along a plane of symmetry 62 (shown in broken lines) at the upper most portion of the cylindrical body portion of the male spline. This lip is the normal result of the meeting point between the two mold halves used to form the male spline. When the prior art male splines were journaled within the channel, the mold lip rubbed up against the inner wall of the channel creating friction and resistance to rotation. The truncated flat edge 60 of the current design still includes the mold lip. However, because the truncated surface 60 extends along a plane 64 which is substantially perpendicular to the plane of symmetry, the lip is now located in the center of the surface 60 and no longer rubs against the inside wall of the channel 28. The truncated flat spot 60 further provides a discharge channel which can discharge debris and water outwardly at the end of the spline channel 28.

It can therefore be seen that the instant invention provides an articulated wiper blade assembly 10 which optimizes "flip" of the wiper blade, i.e. male spline 30. The provision of thin-walled, resilient spline legs 24, 26 which permit some flexure of the spline legs so as not to bind the male spline 30 during rotation thereof is a key feature critical in achieving the improved performance and operation of the present invention. Furthermore, the provision of a male spline wiper blade wherein the cylindrical journaled body portion of the spline is truncated to further reduce friction between the body portion of the male spline and the interior channel surface of the female spline is another key feature which adds to the highly reliable design of the present invention. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An articulated twin spline windshield wiper assembly comprising:

a polymeric female spline including a planar backbone and two arcuate spline legs which depend from a lower side of the planar backbone in spaced symmetrical relation to define a cylindrical spline channel; and an elastomeric male spline having a cylindrical body portion rotatably journaled within said spline channel of said female spline, said male spline further including a neck portion depending from the body portion, and a wiping portion depending from the neck portion, said wiping portion including opposing wiping edges which are alternately engagable with a surface to be wiped upon rotation of the male spline within the female spline channel, said male spline having a plane of symmetry extending through said body portion, said neck portion and said wiping portion, said body portion being truncated along a plane which extends substantially perpendicular to the plane of symmetry.

\* \* \* \* \*